United States Patent [19]
Bernard et al.

[11] Patent Number: 6,124,053
[45] Date of Patent: Sep. 26, 2000

[54] FUEL CELL WITH INTERNAL COMBUSTION CHAMBER

[75] Inventors: Randolph M. Bernard, New Preston; Jeffrey Allen, Naugatuck, both of Conn.

[73] Assignee: Fuel Cell Technologies, Inc., New Milford, Conn.

[21] Appl. No.: 09/112,929

[22] Filed: Jul. 9, 1998

[51] Int. Cl.[7] .................................................. H01M 2/00
[52] U.S. Cl. ............................ 429/34; 429/26; 429/17; 429/18; 429/38
[58] Field of Search ................................ 429/34, 38, 39, 429/26, 17, 22, 18

[56] References Cited

U.S. PATENT DOCUMENTS

| | | | |
|---|---|---|---|
| 5,045,414 | 9/1991 | Bushnell et al. | 429/17 |
| 5,047,299 | 9/1991 | Shockling | 429/20 |
| 5,422,195 | 6/1995 | Bernard | 429/17 |
| 5,518,827 | 5/1996 | Matsumura et al. | 429/19 |
| 5,741,605 | 4/1998 | Gillett et al. | 429/31 |
| 5,900,329 | 5/1999 | Reiter et al. | 429/17 |
| 5,931,658 | 8/1999 | Sederquist et al. | 431/207 |
| 5,989,739 | 11/1999 | Zur Megede et al. | 429/13 |

FOREIGN PATENT DOCUMENTS 0 810 684 A2   12/1997   European Pat. Off. .

OTHER PUBLICATIONS

Ewe, "Green Power Plant: The Hot Module on the Energy Market," *bild der wissenschaft*, pp. 2–8, Nov. 1996.

Farooque, Internal reforming molten carbonate fuel cell system with methane feed, U.S. Pat. 5,084,362, Jan. 28, 1992, abstract only.

Hirata et al., "Fuel Cell," USSN 5,532,073, published Jul. 2, 1996, abstract only.

Kobayashi and Yoshida, "Electric power producing system using molten carbonate type fuel cell," U.S. Pat. 5,094,926, Mar. 10, 1992, abstract only.

Koga et al., "Power generation system using molten carbonate fuel cell," U.S. Pat. 5,082,752, Jan. 21, 1992, abstract only.

Kunz et al., Molten carbonate fuel cell sulfur scrubber, U.S. Pat. 5,213,912, May 25, 1993, abstract only.

Marianowski and Petri, "Fully internal manifolded fuel cell stack," US Pat. 5,342,706, Mar. 30, 1994, abstract only.

Miyauchi et al., "mehtod of and apparatus for utilizing and recovering CO sub 2 in combustion exhaust gas," US Pat. 5,232 793, Aug. 03, 1993, abstract only.

Reiser, "Molten carbonate fuel cell power plant," U.S. Pat. 5,084,363, Jan. 28, 1992, abstract only.

Saito, "Method for heating during startup of fuel cell power plants," JP 8–078034, published Mar. 22, 1996, abstract only.

*Primary Examiner*—Maria Nuzzolillo
*Assistant Examiner*—R. Alejandro
*Attorney, Agent, or Firm*—Banner & Witcoff, Ltd.

[57] ABSTRACT

A novel fuel cell design is provided having a combustion chamber manifold internal to a fuel cell stack and interfacing one or more anode passage outlets and cathode passage inlets. The combustion chamber is equipped to combine a primary source of oxidant gas with an anode exhaust stream and to combust the mixture, if desired, for use as fuel within the cathode passage. The fuel cell design also provides an external gas manifold for directing carrier gas to the cathode passages upstream of the cathode passage inlets for combining with the combustion chamber exhaust prior to entry into the cathode passages.

19 Claims, 6 Drawing Sheets

FUEL CELL WITH INTERNAL COMBUSTION CHAMBER

BACKGROUND OF THE INVENTION

1. Field of the Invention

Embodiments of the present invention relate generally to fuel cells which utilize an external fuel source to generate electric power as a result of a chemical reaction between the fuel and an electrolyte. More particularly, embodiments of the present invention relate to novel fuel cell designs that utilize a combustion chamber manifold internal to the fuel cell stack for combusting and/or transferring fuel exhaust gases from an anode passage, or mixtures thereof with other gases, to a cathode passage. Embodiments of the present invention further relate to novel fuel cell designs that utilize a gas delivery manifold external to the fuel cell stack for delivering carrier and/or cooling gases for further use in the fuel cell system.

2. Description of Related Art

In fuel cells of conventional design having carbonate as an electrolyte and which attempt to recycle gases, carbonaceous fuels such as hydrocarbons are mixed with steam and/or air to produce hydrogen and other gases which are then provided to the fuel cell anode passage for the required anode reaction. At the cathode passage, oxidant or air and carbon dioxide are supplied for the required cathode reaction. The carbon dioxide supplied to the cathode passage is typically generated from the anode exhaust which typically includes as components steam, carbon dioxide, carbon monoxide, and hydrogen. Conventionally, the anode exhaust is directed via high temperature stainless steel tubing to a separate burner unit exterior to the fuel cell where the hydrogen and carbon monoxide are then combusted with air to produce carbon dioxide for use in the cathode reaction.

The carbon dioxide, along with other gases within the burner unit, are then directed back into the fuel cell via high temperature stainless steel tubing which is coupled to an inlet manifold of the cathode passage. The disadvantages of this type of external burner unit fuel cell system include the cost associated with the external burner unit and the high temperature stainless steel tubing along with the system being comprised of separate units and tubing which increases heat loss from the system, as well as leaks or breaks in the system thereby affecting fuel cell performance. In addition, this type of conventional fuel cell must be heated by a separate heating unit external to the fuel cell to an operating temperature typically in the range of 650° C. to transform the electrolyte associated with carbonate fuel cells into a molten form before the fuel cell can generate electricity.

A second type of externally manifolded fuel cell system includes a catalytic burner unit configured directly within the cathode inlet manifold itself but exterior to the cathode gas passages. However, this fuel cell design unnecessarily increases the complexity of the cathode inlet manifold itself and suffers from the performance, economic and repair drawbacks associated with using a expensive catalyst system to effect combustion of gases.

A third type of fuel cell system is described in U.S. Pat. No. 5,422,195. In this type of fuel cell, the fuel and oxidant gases are simply mixed in the oxidant manifold or cathode gas passages. No specific combustion zone is provided so the gas will combust when and if there is sufficient energy anywhere in the system, including the interior of the cathode passages which may create undesirable temperature gradients with the fuel cell stack.

A fourth type of fuel cell such as that disclosed in EP 081 0684A2 transfers the spent fuel directly to the oxidant by small holes or pores in the electrolyte matrix structure. This fuel cell is disadvantageous in that unused fuel must pass through the cathode on the way to the oxidant gas chamber allowing unreacted and undiluted hydrogen gas to react with the NiO cathode according to the reaction: $H_2+NiO=Ni+H_2O$. This reduction of the cathode to metallic Ni at these locations may cause cathode degradation and shrinkage thereby reducing its ability to support the matrix/electrolyte structure above and leading to cracking and further leakage and degradation of the cell. The fuel cell is further disadvantageous in that the concentration of $H_2$ decreases as the gas is reacted at the anode and passes from the fuel inlet to the fuel exit side of the cell. Therefore the concentration of unreacted $H_2$ fuel will be higher in the passages through the electrolyte structure which are closer to the fuel inlet. This fuel, therefore, will not generate electricity thereby reducing efficiency of the fuel cell as a whole.

SUMMARY OF THE INVENTION

Embodiments of the present invention relate generally to fuel cell systems which utilize an external fuel source, such as hydrogen obtained from hydrocarbon and steam mixtures, to generate electric power. The fuel cell systems of the present invention are configured to introduce and/or circulate or recirculate exhaust or other gases to act as fuel gases, oxidant gases, carrier gases or cooling gases during operation of the fuel cell system.

According to certain aspects of the present invention, a fuel cell is provided having one or more anode passages capable of transmitting or channeling a fuel gas composition, such as a hydrocarbon fuel gas and water composition, therethrough. The combination of one or more anode passages creates what is termed herein as an "anode flow field". The fuel gas in turn contacts with a reforming catalyst within the anode flow field which converts the hydrocarbon and water in the fuel gas composition to hydrogen and carbon dioxide. The hydrogen in the fuel gas in turn contacts with an anode at which an exothermic chemical reaction occurs to oxidize the fuel gas thereby releasing electrons. The fuel cell also has one or more cathode passages capable of transmitting an oxidant gas composition therethrough. The combination of one or more cathode passages creates what is termed herein as a "cathode flow field". The oxidant gas in turn contacts with a cathode where an exothermic chemical reaction occurs to reduce the oxidant gas thereby accepting electrons. An electrolyte is operatively coupled to the anode and the cathode which will conduct an electric current therebetween. The combination of an anode, a cathode and an electrolyte forms a cell according to the present invention, and more particularly, a fuel cell where an external fuel source is used to generate electricity, such as by contacting a fuel gas with an anode and an oxidant gas with a cathode. Electrical contacts or leads are provided at the anode and the cathode for purposes of including the fuel cell system into an electrical circuit. According to the present invention, separate fuel cells, on the order of hundreds if desired, may be electrically connected in series to form what is well known in the art as a "fuel cell stack". The fuel cell stack is contained within a fuel cell stack containment vessel.

According to a further aspect of the present invention, a combustion chamber manifold is in fluid communication with one or more anode passage outlets and one or more cathode passage inlets such that fuel exhaust from the anode passage is received into the combustion chamber manifold.

The combustion chamber manifold is also in fluid communication with an oxidant gas source which distributes oxidant gas, if desired, within the combustion chamber manifold to be combined with fuel exhaust and to support combustion when needed. The gaseous components within the combustion chamber manifold may be combusted, if desired, in accordance with the desired operation parameters of the fuel cell system. Gases within the combustion chamber manifold are then transferred to one or more cathode passages via the cathode passage inlets.

According to an additional aspect of the present invention, the combustion chamber manifold is internal to the fuel cell stack intermediate a first and second end of the fuel cell stack with the anode passage outlet and cathode passage inlet directly communicating with the combustion chamber manifold. The combustion chamber manifold is formed by openings through the plates forming each individual fuel cell which, when placed together into a stack, form a vertical passage through the fuel cell stack. The combustion chamber manifold is therefore referred to herein as an "internal manifold". In this manner, fuel exhaust gases do not travel outside of the fuel cell stack before entering the cathode passage, i.e. the fuel exhaust gases remain within the interior of the fuel cell stack during combustion and while entering the cathode passage.

According to one embodiment, the cathode passages are in fluid communication with a source of a carrier gas to promote the transfer and/or cooling of gases from the combustion chamber manifold through the cathode passages. The carrier gas is directed to the cathode passages by an external gas manifold positioned external to the fuel cell stack but internal to the fuel cell stack containment vessel and interfacing open faces of the cathode passages on one end of the fuel cell stack. The source of oxidant gas and the source of carrier gas are capable of being regulated to alter the composition and/or temperature of gases within the combustion chamber manifold and/or the cathode passages. According to one embodiment of the present invention, the combustion chamber manifold is in fluid communication with a plurality of anode passage outlets and cathode passage inlets such as when a plurality of fuel cells are connected in series to form a fuel cell stack in the fuel cell system. Likewise, the external gas manifold is in fluid communication with entrances to the cathode passages to allow flow of the carrier gas from the external gas manifold through the cathode passages.

The fuel cell system of the present invention advantageously provides a mixing chamber interior to the fuel cell stack into which anode exhaust gases are received and then combined, if desired, with other gases introduced into the mixing chamber such as one or more oxidant or secondary fuel sources. As previously discussed, the fuel cell system of the present invention also includes a combustion chamber interior to the fuel cell stack where the mixed gaseous components are combusted. To the extent mixing and combustion occurs in the same chamber, the terms "mixing chamber" and "combustion chamber" are synonymous. However, it is within the teachings of the present invention to include separate chambers or separate locations within a single chamber for the mixing and combustion of gaseous components interior to the fuel cell stack.

According to the present invention, the combustion chamber can be heated to a desired temperature and gaseous components can be regulated into the combustion chamber from various sources in desired amounts to promote and/or initiate combustion of the resultant mixture within the combustion chamber, thereby localizing combustion and heat production to a defined region within the fuel cell stack but exterior to the active fuel cell components, such as the anodes and the cathodes. In this manner, the active fuel cell components are protected from direct impingement of flames and other detrimental by-products of the combustion. The combustion chamber may optionally include a combustion catalyst to initiate or promote combustion. The composition of gaseous components within the combustion chamber can be controlled in order to optimize the performance of the fuel cell system under different or changing operating conditions.

Additionally, the fuel cell system advantageously provides one or more sources of carrier and/or cooling gases which are combined with the combusted anode exhaust gases from the combustion chamber during operation of the fuel cell system. The carrier or cooling gases can be oxidants or any other suitable gas. In this manner, the fuel cell system of the present invention is capable of altering, adjusting, or optimizing the composition and/or temperature of gaseous components during continued operation by either introducing gases into the fuel cell system or by recycling existing gases from within the fuel cell system.

According to a certain aspect of the present invention, a manifolding system is provided which regulates the flow of fuel gas, oxidant gas and/or carrier gas into the combustion chamber and/or cathode gas passages such that a desired amount of a fuel gas or oxidant can be mixed with fuel exhaust to promote combustion of the fuel gas, to promote oxidation at the cathode and/or to promote heating or cooling of the system as a whole. According to this aspect of the present invention, the manifold controls the composition of the combustion gas within the combustion chamber thereby defining the combustion zone to a specific location within the fuel cell stack.

The combustion chamber in combination with an ignition device can advantageously operate as a start-up burner internal to the fuel cell stack as fuel and oxidant can be introduced into the combustion chamber via additional conduits separate from the anode passages. The ignition device can then ignite the fuel and oxidant mixture within the combustion chamber to begin the heating and operation of the fuel cell system. Alternatively, an ignition chamber including an ignition device in fluid communication with a diffusion tube extending through the combustion chamber can be used to evenly distribute heat and combustion products to the cathode passages. Fuel and oxidant can be introduced into the ignition chamber and diffusion tube and then ignited. The heat and combustion products can then flow through the diffusion tube where they are evenly distributed within the combustion chamber for even distribution to the cathode passages. This embodiment of the present invention advantageously eliminates the need for an external start-up burner to heat the fuel cell system. In addition, this embodiment can be utilized during operation of the fuel cell of the present invention to provide excess heat, in addition to what may normally be provided by the fuel cell itself, as may be required for co-generation applications outside of the fuel cell. Many applications for fuel cells will benefit from embodiments of the present invention which are designed to utilize heat generated by the fuel cell where generation of electricity is not required for applications external to the fuel cell, thereby increasing the overall efficiency of the fuel cell. In this manner, the fuel cell is kept hot during an idle mode, while the heat generated is transferred to an application exterior to the fuel cell.

Embodiments of the present invention are advantageous in that they provide a fuel cell system having a combustion chamber and manifolding system internalized within the fuel cell stack thereby eliminating unnecessary structure and expense of conventional fuel cell systems utilizing combustion apparatus external to the fuel cell stack. The combustion chamber and manifolding system serves the dual purpose of localizing the combustion of fuel exhaust gas while also acting as a manifold to transfer the fuel exhaust gas to the cathode passages, all within the fuel cell stack. Fuel cell systems of the present invention are further advantageous in that the combustion chamber and manifolding system is designed to receive a source of oxidant gas and the cathode passages are designed to receive a source of carrier gas, each of which may be separately regulated to optimize the operating conditions of the fuel cell system.

These novel aspects of the present invention allow the fuel cell system to operate without a separate external start up burner to heat the fuel cell stack to an operating temperature since heat produced from the combustion chamber and the exothermic chemical reactions within the fuel cell stack are capable of heating the fuel cell system internally to an operating temperature. Also, the placement of the combustion chamber directly adjacent the cathode passage advantageously allows heating of the oxidant prior to entry into the cathode passage thereby reducing large temperature gradients through the cathode passage which can impair performance of the fuel cell system. Combustion of the fuel exhaust gas is also advantageously achieved by the fuel cell system of the present invention since the combustion chamber and manifolding system allows the introduction of an oxidant gas which will support combustion of the fuel exhaust gas under most temperature conditions. Combustion of the exhaust gas within the fuel cell stack advantageously limits the heat loss of the fuel cell stack as a whole thereby improving the operating efficiency of the fuel cell system. In addition, the ability of the fuel cell system to combust the fuel exhaust gas at room temperature within the fuel cell stack advantageously eliminates the need for an external start up burner as previously indicated.

Accordingly, it is an object of the present invention to provide a fuel cell system having an internal combustion chamber. It is a further object of the present invention to eliminate the need for a start up burner to heat up the fuel cell stack to an operating temperature. It is an additional object of the present invention to provide a fuel cell system which is capable of combining oxidant gas with fuel exhaust gas internal to the fuel cell stack. It is a further object of the present invention to reduce temperature gradients across cathode passages during operation of a fuel cell stack. It is a still further object of the present invention to improve the efficiency and operability of fuel cell systems. It is a further object of the present invention to provide a fuel cell system that can provide excess heat for co-generation applications and that can control excess heat independently of the electrical output of the fuel cell stack.

These and other objects, features or advantages of the present invention will become apparent from the following description taken in conjunction with the accompanying drawings.

BRIEF DESCRIPTION OF THE DRAWINGS

In the course of the detailed description of certain preferred embodiments to follow, reference will be made to the attached drawings, in which.

DETAILED DESCRIPTION OF CERTAIN PREFERRED EMBODIMENTS

The principles of the present invention may be applied with particular advantage to provide a fuel cell system eliminating many of the disadvantages associated with conventional fuel cell designs.

Figure 1:
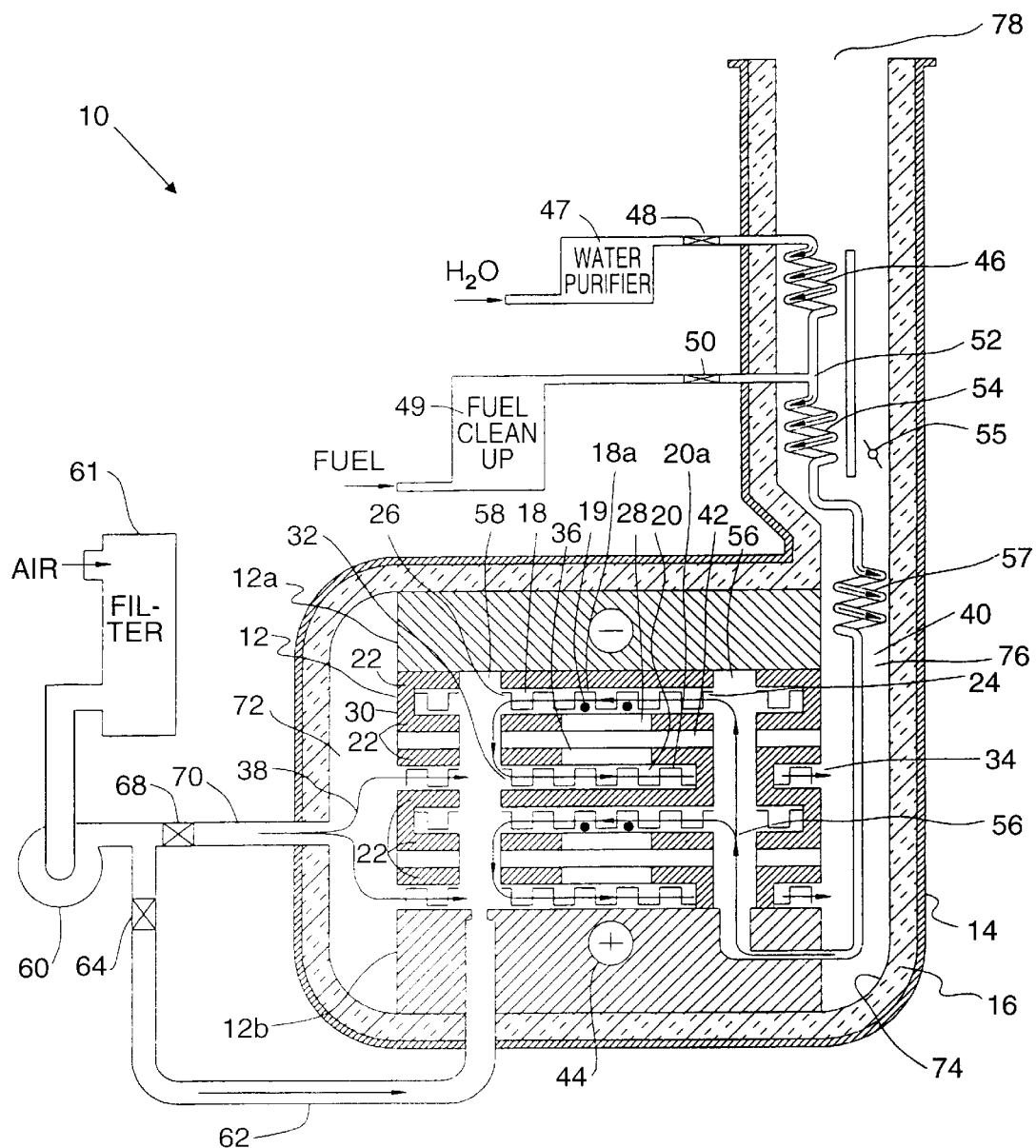
FIG. 1 is an illustrative schematic view of one embodiment of a fuel cell system in partial cross section in accordance with the teachings of the present invention.

FIG. 1 is a schematic of a fuel cell system 10 shown in cross-section in accordance with the teachings of the present invention. As can be seen in FIG. 1, individual fuel cells are connected in series to form fuel cell stack 12 which is enclosed within a fuel cell stack containment vessel 14 lined with thermal insulation 16. Although two fuel cells are depicted in FIG. 1, it is to be understood that many fuel cells, on the order of hundreds if desired, may be connected in series to form a fuel cell stack depending upon the amount of electricity desired to be produced by the fuel cell system. As can be seen in FIG. 1, the fuel cell stack is generally in the shape of a cube or rectangular box configuration which advantageously provides for convenient flow of fuel and oxidant gases and is generally supported within the containment vessel by thermal insulation blocks (not shown).

The vessel 14 is made of any suitable material and is typically constructed of steel for purposes of strength and in some embodiments, to withstand pressure forces internal to the vessel. Vessel 14 can be of any desired size and shape, however typical vessels will range on the order of 2 to 6 meters high and 1 to 4 meters wide and will have a cubic, rectangular, round or bell shape.

According to FIG. 1, each fuel cell has an anode passage 18 and a cathode passage 20 formed in part by separator plates 22. The anode passages together form an anode flow field and the cathode passages together form a cathode flow field. Typical separator plates useful in the present invention include those made from 0.01 inch thick stainless steel SS-3 16 sheet stock. The surface of the separator plate contacting the fuel gas is coated with nickel for protection while the edges include an aluminum coating for protection. Separator plates may range in area up to 10 square feet and beyond. As can be seen in FIG. 1, the separator plates include a gas passage having a thickness of about ⅛ inch or less. The thickness of the gas passage is generally selected to provide an allowable pressure drop for a given system, however, typical gas passage thicknesses are between about 0.04" and 0.125". The total thickness of a separator plate and gas passage assembly, therefore may range between about ⅛ to ¼ inch thick.

Anode passage 18 has an anode passage inlet 24, an anode passage outlet 26 and an anode 28 positioned to be in contact with the interior of the anode passage 18. Anode passage 18 has a reforming catalyst 19 positioned to be in contact with the fuel gas so as to convert a hydrocarbon fuel such as methane in the fuel gas to hydrogen which can be utilized by the fuel cell. As can be seen in FIG. 1, the anode passage 18 is confined within the fuel cell stack 12 by plates 22 and walls 30 and is capable of transmitting or channeling a fuel gas composition therethrough which in turn contacts with the anode where a chemical reaction occurs to oxidize the fuel gas in an exothermic reaction.

As can be further seen in FIG. 1, the cathode passage 20 has a cathode passage inlet 32 and a cathode passage outlet 34 and a cathode 36 positioned to be in contact with the interior of the cathode gas passage 20. According to one embodiment of the present invention, the cathode passage 20 extends through the fuel cell stack 12 with entrances 38 upstream of the cathode passage inlets. The cathode passage outlet 34 or entrances 38 communicate with the interior 40 of the vessel 14. The cathode passage 20 is capable of transmitting an oxidant gas composition therethrough which in turn contacts with the cathode 36 where a chemical reaction occurs to reduce the oxidant gas in an exothermic reaction. An electrolyte 42 is operatively coupled to the anode and the cathode which will conduct an electric current therebetween. The electrolyte is typically contained within the pores of a inert ceramic powder bed including a $Li/AlO_2$ ceramic. The powder bed is fabricated by mixing the ceramic particles with binders and plasticizers and tape casting. The resulting structure is generally known as a "tape cast matrix". During heating of the ceramic powder bed, the organic binders combust leaving pores. When the electrolyte melts it fills these pores via capillary action forming a matrix/electrolyte structure.

Electrical contacts or leads 44 are provided at the upper and lower end plates 12a and 12b of the fuel cell stack for purposes of including the fuel cell system into an electrical circuit. Upper and lower end plates 1 2a and 1 2b are typically thick and function to terminate the stack of sheet metal cells with a heavy block that can transfer the compressive load uniformly. The + and − signs refer to the electrical polarity of the cells. The cells are in series so the voltage of each cell accumulates across the stack of cells. To generate electricity, a connection is made via terminals to the end blocks through an external circuit that conducts the flow of electrons according to the fuel cell reaction.

Basic fuel cell structures such as the orientation of the anode, cathode, electrolyte, leads and the chemical reactions which produce electric charge are disclosed in Hirschenhofer, J. H., Stauffer, D. B., Engelman, R. R., *Fuel Cells: A Handbook* (Revision 3), U.S. Department of Energy, Office of Fossil Energy, Morgantown Energy Technology Center P.O. Box 880, Morgantown, W.V. 26507-0880, DOE/MTEC-94/1006 (DE94004072) hereby incorporated by reference in its entirety.

It is to be understood that the anode, cathode and electrolyte can be fashioned from any materials suitable for use in a fuel cell. It is also to be understood that although a reforming catalyst is shown within the anode chamber the reforming catalyst could also be located within a separate chamber within the fuel cell stack or in a separate reformer outside of the fuel cell stack. Suitable reforming catalysts are made of nickel supported on a magnesium oxide, aluminum oxide or lithium aluminate. According to one embodiment of the present invention, a molten carbonate fuel cell, for example, may have an anode constructed of nickel and aluminum or nickel and chromium alloy. Copper or Cu/Ni alloys are also suitable for use as anode materials. Cathodes within the scope of the present invention may be constructed of lithiated nickel oxide or lithiated cobalt oxide. Suitable electrolytes useful in a carbonate fuel cell include a mixture of lithium and potassium carbonate or lithium and sodium carbonate which may further include additives such as magnesium oxide to stabilize the cathode.

Referring to FIG. 1, first heat exchanger 46 is positioned within vessel 14 in a manner to allow cathode exhaust gas from the cathode flow field to contact heat exchanger 46. Water enters vessel 14 via valve 48 and water purifier 47. Commercial water purifiers are suitable in the practice of the present invention and typically include an activated carbon bed to remove chlorine, a softener to remove calcium and magnesium, a reverse osmosis membrane to remove other dissolved contaminants and a mixed bed ion exchange column for final purification. The water is directed to first heat exchanger 46 which then converts the water into steam using the heat from the cathode exhaust gas. Fuel, such as natural gas, enters vessel 14 through valve 50 and desulfurizor 49 and is directed via conduit 52 to be mixed with the steam to produce a fuel/steam mixture. Suitable desulfurizors (identified as fuel clean up at 49) include mixed beds of activated carbon and chemically treated carbon or hydrodesulfurization units to remove sulfur containing odorants and other harmful contaminants from the fuel. The fuel/steam mixture is then directed to a second heat exchanger 54 which contains a catalyst for pre-reforming the fuel to convert higher hydrocarbons which may be present in a natural gas feed to $CH_4$, hydrogen and $CO_2$ in a manner to allow the fuel to react with the steam reforming catalyst 19 to produce a fuel gas, such as hydrogen, to be used in the anode flow field. Suitable pre-reforming catalysts include nickel supported on magnesium oxide or aluminum oxide. The second heat exchanger 54 containing the pre-reforming catalyst is positioned in a manner to allow cathode exhaust gas from the cathode flow field to contact the second heat exchanger 54. The temperature of the cathode exhaust gas is sufficient to heat the pre-reforming catalyst to operating temperatures. The temperature of the first heat exchanger 46 and second heat exchanger 54 are controlled by the damper 55 which allows a portion of the cathode exhaust gas to exit the vessel 14 without bypassing the first and second heat exchangers 46 and 54. A third heat exchanger 57 receives the fuel from the second heat exchanger and is positioned intermediate the interior wall of vessel 14 and cathode passage outlets 34 in a manner to allow cathode exhaust gas from the cathode flow field to contact the heat exchanger 57. The temperature of the cathode exhaust gas is sufficient to heat the third heat exchanger to operating temperatures. In the case of a hydrocarbon, such as methane, the hydrocarbon reacts with the steam to produce hydrogen and carbon monoxide. Fuels according to the present invention include such carbonaceous fuels as natural gas, methane, gasified coal or liquid fuels such as gasoline, diesel, jet fuel etc. which have been gasified.

A fuel delivery manifold 56 internal to the fuel cell stack 12 is connected to the third heat exchanger 57 and directs the fuel/steam mixture to anode passages 18 via anode inlets 24 to produce the anode flow field. According to a preferred embodiment of the present invention, the fuel delivery manifold 24 is preferably in the form of a chamber extending through the fuel cell stack and is configured to interface or open into the anode passage inlets 18 for the delivery of fuel gas therethrough.

The anode passages 18 traverse the fuel cell stack 12 and are contained within the fuel cell stack 12 being bounded by plates 22 and walls 30 as previously described. Anode passages 18 include a current collector/gas passage structure 18a as indicated within the anode passage of FIG. 1. Typically the structure indicated by 18a is formed from thin 0.01" SS-3 16 sheet metal which is corrugated and/or perforated in a manner that allows it to form gas passages, to support the electrodes against the electrolyte, and to conduct electrical current from the electrode through the bipolar plate. A similar structure inside cathode gas passage 20 is shown at 20a. The anode passages 18 interface with combustion chamber 58. As with fuel delivery manifold 56, combustion chamber 58 is internal to the fuel cell stack 12 and is preferably in the form of a chamber extending through the fuel cell stack 12 and interfacing the anode passage outlets 26. As can be seen in FIG. 1, combustion chamber 58 also interfaces the cathode passage inlets 32 in a manner to allow the gases within the combustion chamber 58 to flow to the cathode passage 20. According to one embodiment of the present invention, the combustion chamber or the fuel delivery manifold are formed from openings in each plate contributing to the fuel cell stack such that when the plates are stacked one on top of each other, a chamber through which gases can flow is formed. In the case of the fuel delivery manifold 56, the fuel gases flow from a source and are directed to the anode passage inlets via the fuel delivery manifold within the fuel cell stack. In the case of the combustion chamber, the anode exhaust gases flow from the anode passage outlets to the cathode passage inlets via the combustion chamber manifold within the fuel cell stack. In this manner, anode exhaust gases remain within the interior of the fuel cell stack upon entry into the cathode passage inlets. The combination of the flow route of gasses from the anode passages into the combustion chamber and then into the cathode passages is referred to herein as a manifolding system. This manifolding system can also include flow paths for one or more oxidant sources, one or more secondary fuel sources and one or more cooling gas sources into and/or out of the combustion chamber and/or cathode passages.

Combustion chamber 58 is in fluid communication with a first source of oxidant gas, which, in a preferred embodiment, is capable of being regulated. As can be seen in FIG. 1, a suitable oxidant gas source is a fan or blower shown at 60 which is capable of forcing an oxidant such as air from outside of the fuel cell into the combustion chamber 58 via conduit 62 and valve 64. This oxidant gas can also serve as a carrier gas. The embodiment of FIG. 1 eliminates the need for a fan or blower internal to the fuel cell system for recirculating exhaust gases or drawing air or other oxidant or carrier gas from outside of the fuel cell system, although fuel cell systems having recirculating fans or blowers internal to the fuel cell system are within the scope of the present invention. Other suitable oxidant gas sources, such as pressurized oxidant gas sources, are also useful in the fuel cell systems of the present invention. In a preferred embodiment, air is used as the oxidant or carrier gas.

Cathode passages 20 are in fluid communication with a source of carrier gas via entrances 38 of cathode passages 20. The gas can be an oxidant gas, a carrier gas, a cooling gas, or any other gas which is useful in the operation of a fuel cell system. As can be seen in FIG. 1, blower or fan 60 draws air from outside of the fuel cell system 10 through a filter 61, via valve 68 along passage 70 and directs the air to external gas manifold 72 positioned external to fuel cell stack 12. External gas manifold 72 interfaces entrances 38 in a manner to allow gas to flow from the external gas manifold 72 to the cathode passages 20. According to one embodiment of the present invention, external gas manifold 72 is formed from the interior wall 74 of vessel 14 and the entrances 38 of fuel cell stack 12. In this manner, the interior wall 74 of vessel 14 advantageously serves as the external gas manifold 72 to direct carrier gas into the fuel cell stack 12.

The carrier gas enters cathode passages 20 through gas delivery manifold 72. The carrier gas serves to transport and/or cool the combustion product of the combustion chamber 58 prior to entering the cathode passage inlets 32, if desired. In the practice of the present invention, combustion chamber 58 interfaces with cathode passage inlets 32. Combustion chamber 58 also interfaces with conduit 62 and anode exhaust passages 26. Air or other suitable oxidant enters combustion chamber 58 through valve 64 and conduit 62. Fuel enters combustion chamber 58 through the anode exhaust passages 26. The composition of the gasses in the combustion chamber 58 is controlled by valve 64 and the fuel valve 50 and the electrochemical utilization of the fuel in the anode gas passages. During operation of the fuel cell system, the combustion chamber is heated to a temperature sufficient to initiate or promote combustion of the gaseous components contained therein. The combustion products then exit into the cathode gas passages 20 where they mix with air or other suitable carrier/cooling gas introduced at the cathode inlet passage 38. It is to be understood that the combustion chamber 58 may also be referred to as a mixing chamber since gaseous components are combined and mixed therein.

The manifolding system described above, which allows anode exhaust gas and oxidant gas to enter the combustion chamber in a desired or controlled amount, advantageously defines an area within the fuel cell stack where combustion occurs thereby limiting undesirable combustion in other areas within the fuel cell stack, such as within the anode or cathode passages themselves. This prevents damage to the anodes and cathodes which may occur from direct contact with flame or other harmful effects of combustion.

Figure 2:
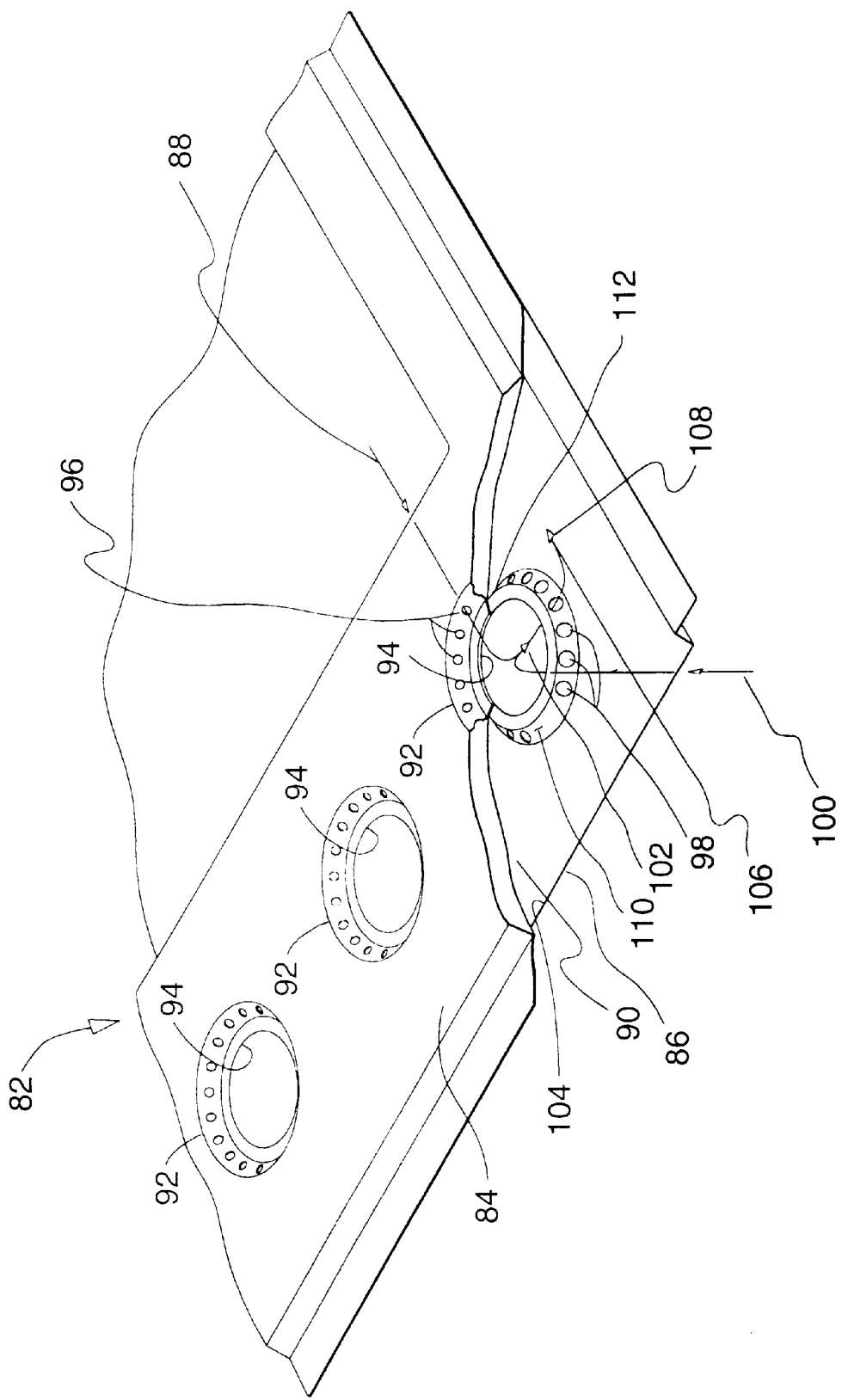
FIG. 2 is a cutaway view of a fuel cell plate assembly showing combustion chamber subunits.

FIG. 2 shows a cutaway view of one embodiment of a fuel cell and internal combustion chamber assembly shown generally at 82. The assembly is formed from a top plate 84 and a bottom plate 86 between which are positioned an anode passage 88 and cathode passage 90. A plurality of combustion chamber subunits are seen generally at 92. A plurality of the assemblies are stacked together such that the combustion chamber subunits coincide to form one or more combustion chambers extending within the fuel cell stack.

The combustion chamber subunits are generally circular openings 94 through the plates 84 and 86 and are configured to receive anode exhaust from the anode passages and to transfer gases from the combustion chamber to the cathode passages. The subunits 92 are stacked together such that a continuous combustion chamber as seen in FIG. 1 extends through the fuel cell stack 12. As can be seen in FIG. 2, orifices 96 are radially arranged around the perimeter of opening 94 adjacent to the anode passage 88 to allow anode exhaust gas to enter the combustion chamber manifold 58 in the manner depicted by the arrow. As can be further seen in FIG. 2, orifices 98 are radially arranged around the perimeter of opening 94 adjacent to the cathode passage 90 to allow gases to exit combustion chamber 58 and to enter the cathode passage 90. Upon entering the combustion chamber 58 via orifices 96, the anode exhaust gas combusts with oxidant indicated by the arrow 100 delivered via the arrangement depicted in FIG. 1. The combustion product indicated by the arrow at 102 exhausts through orifices 98 into the cathode passage 90. As can be seen in FIG. 2, cathode passage 90 has open face 104 along the length of the assembly 82 to allow a carrier gas indicated by the arrow at 106 to enter cathode passage 90. The combustion product combines with the carrier gas as indicated at arrow 108 after exiting the combustion chamber 58 and then travels through the cathode passage 90. In this manner, the composition and temperature of the gas entering the cathode passage may be controlled. With reference to FIGS. 1 and 2, in general, the direction of gas flow is controlled by the pressure in the various gas chambers such that the pressure in the anode gas passage 18 is higher than the pressure in the combustion chamber 58 and the pressure in the combustion chamber 58 is higher than the pressure in the cathode gas passages 20 and the pressure in the cathode gas passages 20 is higher than the pressure in the cathode exhaust outlet 76. The gas pressure is determined in part by the gas flow rates and the size of the openings/orifices 94 and 98 to the combustion chamber 58. According to a preferred embodiment, orifices 96 and 98 are radially arranged around the opening 94 except for an area 110 facing the incoming carrier gas and an area 112 on the opposite side of the opening 94. Area 110 lacks orifices to prevent carrier gas from directly impinging upon, and back feeding, the combustion product of the combustion chamber 58. Area 112 lacks orifices to prevent the combustion product from exiting the combustion chamber 58 into the cathode passage 90 without contacting and combining with the carrier gas.

Figure 3:
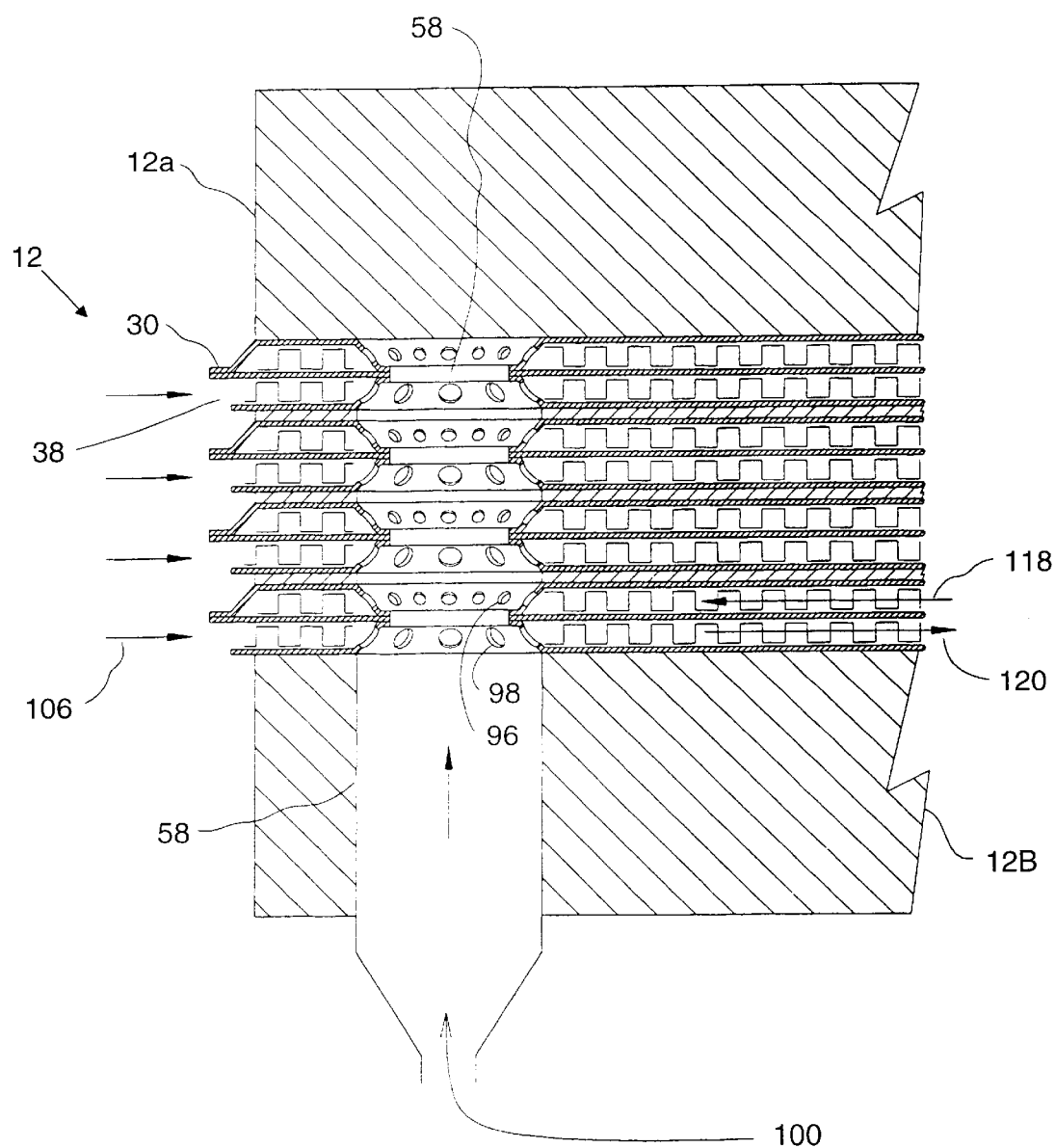
FIG. 3 is an illustrative view of one embodiment of the combustion chamber in cross-section.

FIG. 3 is a cross-sectional view of the fuel cell stack 12 showing the stacking of the combustion chamber subunits 92 of FIG. 2 to form an internal combustion chamber 58 and manifolding system of the present invention. The fuel cell stack 12 is bounded by upper and lower end plates 12a and 12b with the anode passages being closed-ended via walls 30 and with the cathode passages being open-ended via entrances 38. As can be seen in FIG. 3, oxidant 100 provided by blower 60 in FIG. 1 enters the combustion chamber 58 through valve 64 in FIG. 1. Valve 64 is capable of controlling the rate at which oxidant 100 enters combustion chamber 58. Anode flow field 118 travels through the anode passages and enters the combustion chamber 58 through orifices 96 and combines with oxidant 100 prior to combustion. The combustion product exits the combustion chamber 58 through larger orifices 98 where it mixes with carrier gas 106 and travels through the cathode passage as cathode flow field 120. In this manner, the temperature and composition of the combustion products can be altered as desired prior to entry into the cathode passages and the fuel cell system as a whole.

In a preferred embodiment, the anode flow field 118 is parallel to, but flows in the opposite direction of, the cathode flow field 120. It is to be understood that the present design of flow of anode and cathode flow fields represents one embodiments of the present invention and that other suitable flow patterns can be utilized based upon the teachings of the present invention depending upon alternate anode and cathode gas passage configurations.

Figure 4:
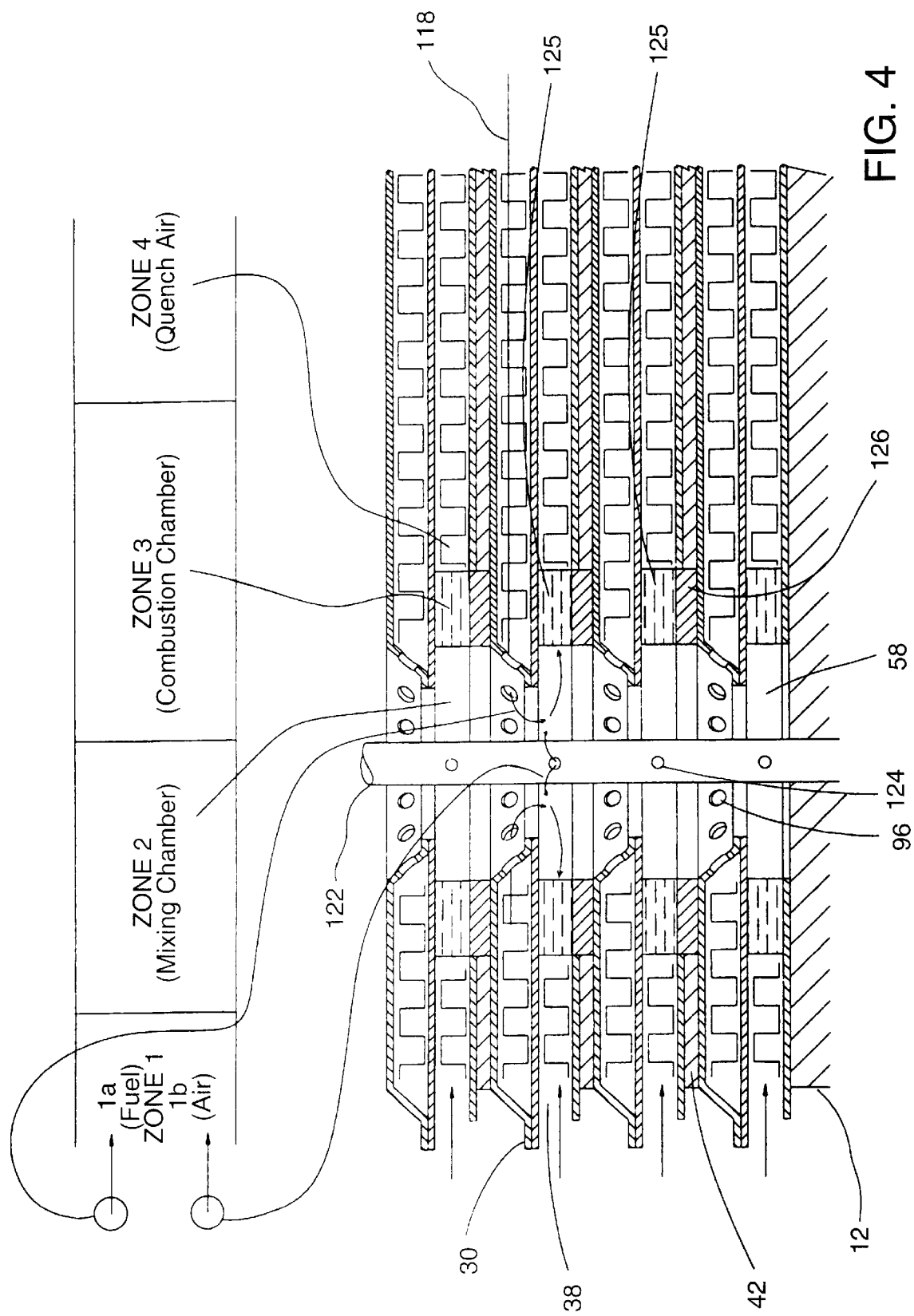
FIG. 4 is an illustrative view of an alternate embodiment of the combustion chamber in cross-section showing a diffusion tube assembly and illustrating separate zones where fuel and oxidant are introduced, mixed, combusted and then quenched and/or cooled within the fuel cell stack.

FIG. 4 illustrates an alternate embodiment of the present invention where a diffusion tube 122 having diffusion openings 124 extends through the combustion chamber 58 in a manner to deliver oxidant uniformly throughout the combustion chamber manifold 58 to ensure uniform mixing of gaseous components and combustion. The embodiment of FIG. 4. is particularly advantageous where the height dimension of the fuel cell stack 12 is such that uniform mixing of oxidant supplied at the base of the fuel cell stack with anode exhaust gas throughout the combustion chamber is discouraged. The diffusion tube 122 may be constructed of aluminized stainless steel or of ceramic and may be fitted with a porosity suited for its intended gas flow rate. The diffusion tube 122 may be periodically supported with dielectric spacers to ensure annular alignment within the combustion chamber manifold 58. FIG. 4 depicts an embodiment of the present invention having four zones, i.e. zone 1 where fuel and oxidant/carrier gas are introduced into zone 2 where the fuel and oxidant/carrier gas is mixed, zone 3 where the mixture is combusted and zone 4 where the combusted mixture is quenched by a quenching source such as air. According to one embodiment of the present invention, each zone corresponds to a separate physical location within the fuel cell system, i.e. zone 1 includes channels for fuel 1a and air 1b to enter zone 2 which is a separate mixing chamber. The mixture than travels to zone 3 which is a combustion chamber wher the mixture is combusted. The combusted mixture then travels to zone 4 where is it quenched by a quenching source such as air before entering the cathode passages.

As shown in FIG. 4, fuel enters mixing chamber 58 via the anode passage outlets 96 and oxidant enters the mixing chamber 58 via the diffusion tube 122 and openings 124. The gasses are then mixed together and travel to a combustion chamber where gaseous components are combusted. The products of the combustion chamber are then quenched and/or cooled by a carrier gas which helps in transporting the combusted components through the cathode passages. A combustion catalyst 125 is located at the inlet to the cathode gas passages 20 such that any fuel which does not combust in the combustion manifold 58 must pass through the combustion catalyst 125 before entering the cathode gas passage 20. Suitable combustion catalysts include platinum supported on stainless steel metal felt or reticulated metal or platinum supported on a porous alumina ceramic or catalysts normally used in automotive catalytic converters or other materials such as oxides of chromium or nickel which have been found to promote combustion of fuel and air mixtures. The embodiment of FIG. 4. is particularly advantageous where the fuel exhaust from the anode gas passages 118 may contain some fuels such as methane which are particularly difficult to combust. Methane may be present in the fuel exhaust under certain transient operating conditions such as changes in the electrical load or during start up and shut down. In the alternate embodiment shown in FIG. 4 a combustion zone spacing ring 126 is located between the combustion zone manifold 58 and the electrolyte structure 42. A spacing ring is advantageous in that it prevents the electrolyte containing structure from direct contact with the combustion zone. In the case where a flame front exists, the spacing ring will prevent direct impingement of the flame on the electrolyte containing structure. Suitable materials for the spacing ring include aluminum oxide, lithium aluminate, or other dielectric oxides which resist corrosion.

Figure 5:
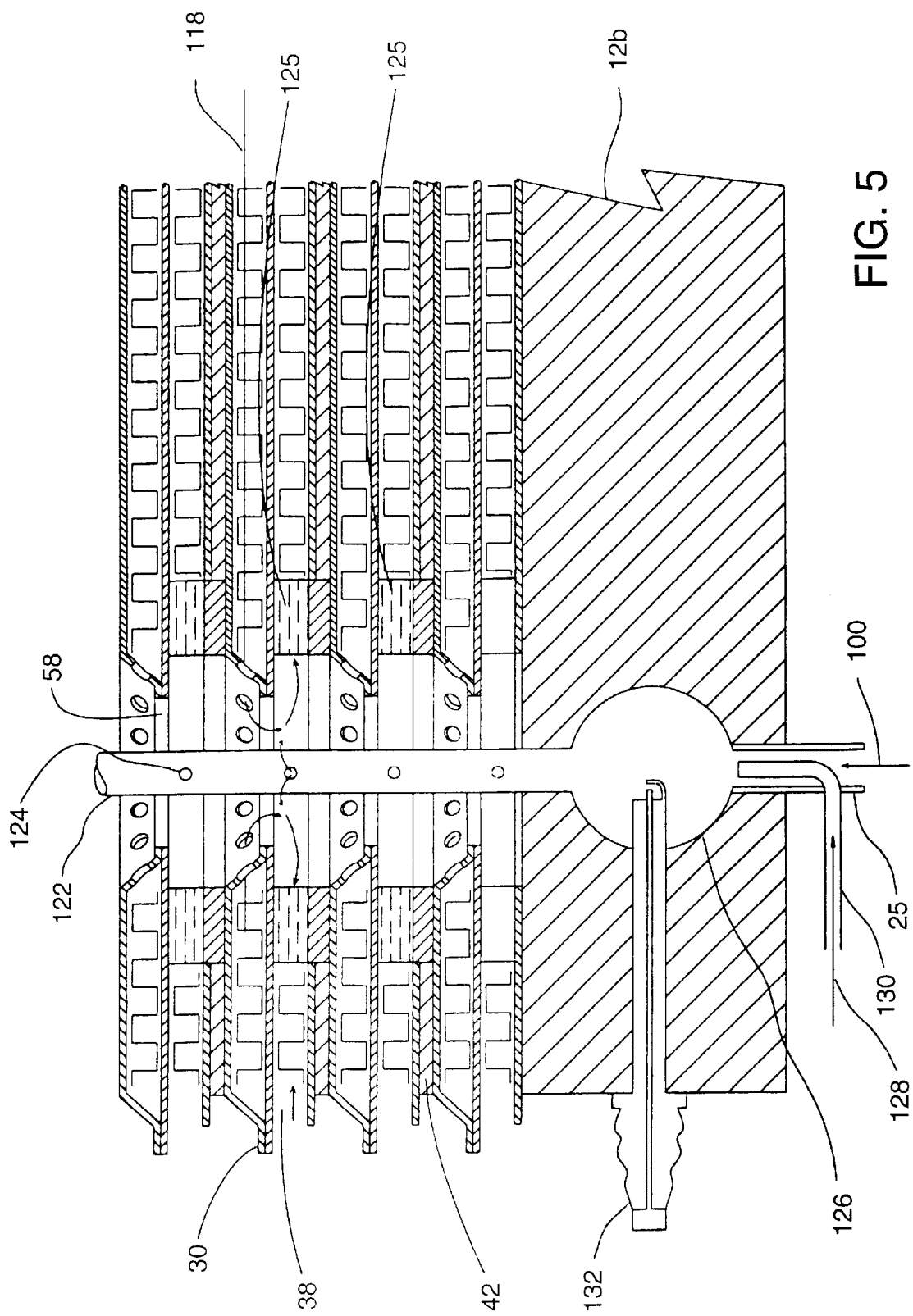
FIG. 5 is an illustrative view of an alternate embodiment of the combustion chamber in cross-section showing an alternate diffusion tube assembly.

FIG. 5 illustrates an alternate embodiment of the present invention where an ignition chamber 126 is positioned within the confines of the lower end plate 12b and is in fluid communication with the diffusion tube 122, a secondary fuel source 128 via conduit 130 and an oxidant source 100 via conduit 25. Suitable secondary fuel sources include natural gas or other carbonaceous fuel sources which have been properly cleaned of sulfur and any other harmful contaminants. According to one embodiment of the present invention, oxidant 100 is drawn into ignition chamber 126 by blower 60 via valve 64 shown in FIG. 1 whereupon oxidant 100 mixes with secondary fuel source 128 and is then combusted by ignition device 132. The combustion product exhausts to the combustion chamber 58 through the diffusion tube 122 and diffusion openings 124. The resultant mixture of combustion product then enters the cathode passages via the orifices 98 in FIG. 3 or then contacts the combustion catalyst 125 described in FIG. 4 whereupon it is mixed with and quenched by the carrier gas entering the cathode passages via entrances 38. The combustion products and heat are thereby diluted and distributed through the cathode passages, and fuel cell stack as a whole, as a means to provide heat to the fuel cell stack during initial start-up operation.

Ignition chamber 126 is equipped with an ignition device to combust gases contained within the ignition chamber. Suitable ignition devices include spark generators used in conventional burners. Ignition chamber 126 is constructed of high temperature stainless steel such as SS-316. According to certain embodiments, the steel is lined with an insulation or refractory oxide for further protection.

During operation of the fuel cell of FIG. 5 with reference to FIG. 1, the amount of secondary fuel source 128 and oxidant 100 are gradually increased to achieve the desired heating rate as combustion products and heat are distributed through the combustion chamber 58, cathode passages and into the cathode exhaust manifold 76 via cathode passage outlets 34. The cathode exhaust gas heats the first heat exchanger 46, the second heat exchanger 54 containing the pre-reforming catalyst, and the third heat exchanger all located in the cathode exhaust manifold 76, as well as the individual anode and cathode fuel cell components including the internal reforming catalyst 19.

When the temperature of the individual anode and cathode fuel cell components reaches about 500° C. and when the temperature in the first heat exchanger 46 reaches about 300° C. a small flow of water is initiated generating steam and a small flow of natural gas or other carbonaceous fuel is mixed with the steam, pre-reformed to methane and then directed to the fuel delivery manifold 56. As the mixture of steam and methane contacts the reforming catalyst located within the anode chamber, the $CH_4$ is reformed to $H_2$, $CO_2$ and CO with some $CH_4$ and excess water. The amount of secondary fuel delivered to the ignition chamber 126 and diffusion tube 122 is then reduced in proportion to the amount of fuel being delivered to the fuel delivery manifold 56 to maintain a desired mixture of fuel and oxidant in the combustion chamber 58 and a desired operating temperature. The combustion products from ignition chamber 126 and diffusion tube 122, including excess oxidant and uncombusted fuel combine with the anode exhaust within the combustion chamber 58 where the $H_2$, CO and $CH_4$ from the anode exhaust are combusted with the excess oxidant by the combustion catalyst 125. When the fuel cell reaches a standard operating temperature of between 500° C. and 650° C., the secondary fuel source 128 is discontinued while increasing the amount of fuel entering the fuel delivery manifold 56, anode passages 18, and combustion chamber 58. When the fuel cell reaches a temperature sufficient to generate electricity, for example between 500° C. and 650° C., the fuel flow to the fuel delivery manifold is increased, the positive and negative terminals of the fuel cell stack are connected via an external circuit and the excess fuel is converted to electricity. The anode exhaust gas enters the combustion chamber 58 and is mixed with oxidant and then combusts to form a mixture of $O_2$, $N_2$, $CO_2$ and $H_2O$. This mixture is then combined with a carrier and/or cooling gas prior to entering the cathode passages during the normal operating mode of the fuel cell.

Figure 6:
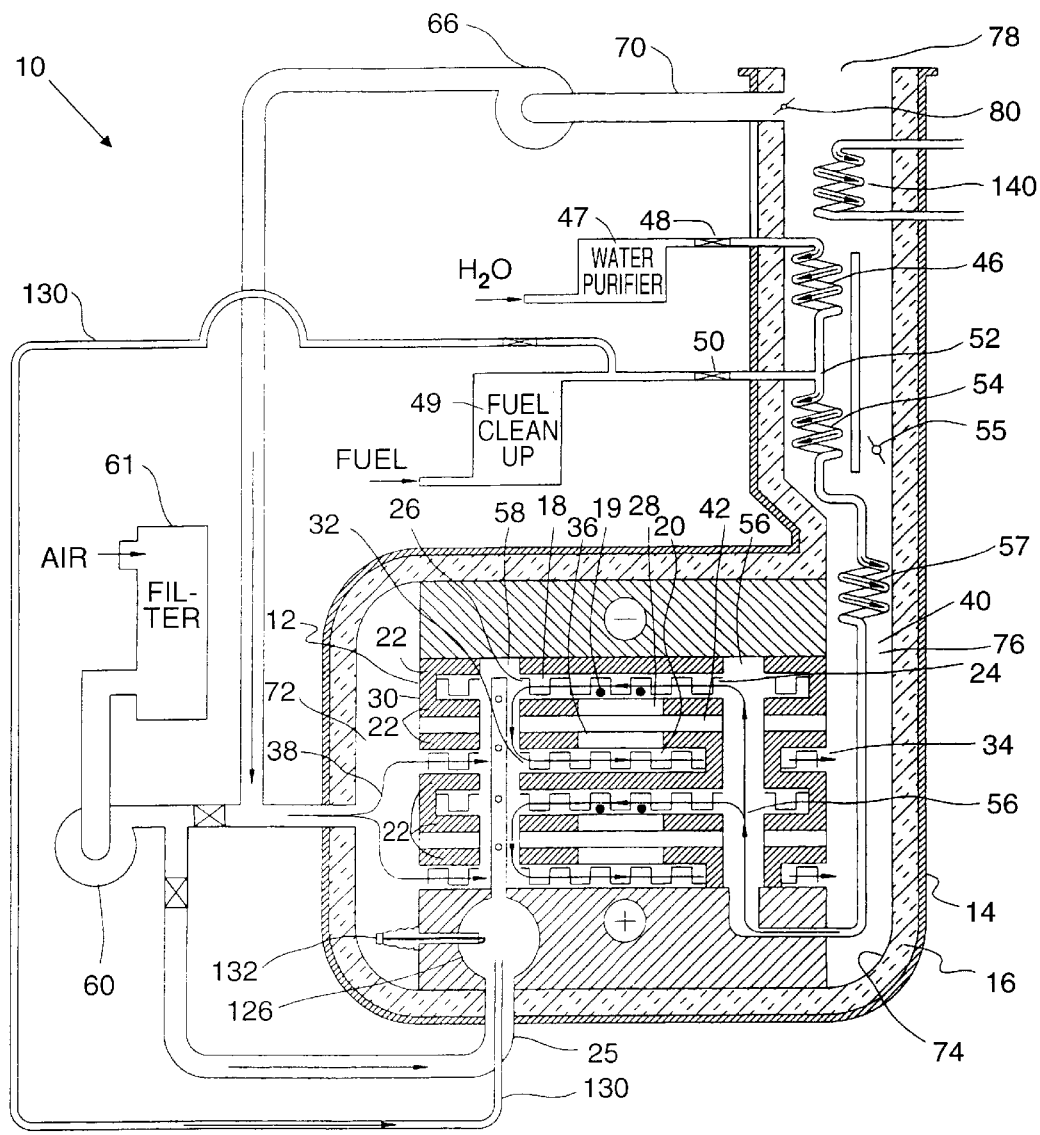
FIG. 6 is an illustrative schematic view of one embodiment of a fuel cell system in partial cross section incorporating the diffusion tube assembly of FIG. 5.

FIG. 6 illustrates a fuel cell system of FIG. 1 incorporating a recycle blower 66 and a heat exchanger 140. The heat exchanger 140 is used to supply heat generated by the fuel cell for co-generation applications outside of the fuel cell. According to an alternate embodiment of the present invention, the fuel cell system is configured to allow cathode exhaust gas to be recirculated through the cathode passages 20 via a cathode recirculation loop as now described. Cathode exhaust gas exits cathode passage outlets 34 into cathode exhaust manifold 76 shown in FIG. 1 formed from the interior wall 74 of the vessel 14 and the cathode passage outlets 34 of the fuel cell stack 12. The cathode exhauset gas then heats the heat exchanger 140 which then supplies heat generated by the fuel cell to applications outside of the fuel cell. The cathode exhaust gas may then exit the vessel 14 via opening 78 or the cathode exhaust gas may enter passage 70 via valve 80 for circulation to external gas manifold 72 via blower 66. During standard operating conditions about half of the cathode exhaust gas exits the vessel 14 via opening 78 with the remaining half of the cathode exhaust gas being recirculated to the external gas manifold 72. The amount being recirculated is controlled by the rotation speed of the blower 66. In this manner, gas entering into cathode passages 20 contain a mixture of fresh oxidant (such as air) and cathode exhaust gas, the ratio of which is determined by the operational mode of the fuel cell stack 12. The recirculated cathode exhaust gas enters cathode passages 20 via external gas manifold 72. The recirculated cathode exhaust gas serves to transport and/or cool the combustion product of the combustion chamber manifold 58 prior to entering the cathode passages 20, if desired. Those skilled in the art will see that the fuel cell system depicted in FIG. 6 constitutes a free standing system capable of startup, control, and shutdown and advantageously provides a significant simplification of the balance of plant.

It is to be understood that the embodiments of the invention which have been described are merely illustrative of some applications of the principles of the invention. Numerous modifications may be made by those skilled in the art without departing from the true spirit and scope of the invention.

What is claimed is:

1. A fuel cell system comprising, in combination:
   a fuel cell stack contained within a containment vessel, the fuel cell stack comprising a plurality of anode passages for channeling fuel gas therethrough and a plurality of cathode passages for channeling oxidant gas therethrough with each anode passage comprising an anode, an anode passage inlet and an anode passage outlet and with each cathode passage comprising a cathode, a cathode passage inlet and a cathode passage outlet,
   an electrolyte operatively coupled to the anode and the cathode,
   electrical contacts operatively connected to the fuel cell stack,
   a fuel delivery manifold in direct fluid communication with a fuel gas source and the anode passage inlets;
   a combustion chamber internal to the fuel cell stack and in fluid communication with the anode passage outlets and the cathode passage inlets,
   a first oxidant source in fluid communication with the combustion chamber, and
   a carrier gas source in fluid communication with the cathode passages.

2. The fuel cell system of claim I wherein the carrier gas source is in fluid communication with combustion products exiting the combustion chamber.

3. The fuel cell system of claim 2 wherein the carrier gas source is in fluid communication with the cathode passages via a cathode gas intake manifold external to the fuel cell stack.

4. The fuel cell system of claim 3 wherein the carrier gas source is external to the fuel cell system and comprises an oxidant source.

5. The fuel cell system of claim 1 wherein the oxidant source is in fluid communication with the combustion chamber via a diffusion tube extending through the combustion chamber.

6. The fuel cell system of claim 5 further comprising a secondary fuel source in fluid communication with the combustion chamber via the diffusion tube and an ignition device disposed within the fuel cell stack for igniting the secondary fuel source in the presence of the oxidant source.

7. The fuel cell system of claim 2 further comprising a recirculation passage interconnecting the cathode passage outlets and the cathode gas intake manifold.

8. The fuel cell system of claim 1 wherein the combustion chamber comprises a plurality of cylindrical chambers extending through the fuel cell stack and interfaces the anode passage outlets and cathode passage inlets.

9. The fuel cell system of claim 1 wherein the oxidant source and the carrier gas further comprise regulators for flow control.

10. The fuel cell system of claim 1 wherein the fuel delivery manifold is internal to the fuel cell stack.

11. The fuel cell system of claim 1 further comprising a heat exchanger to deliver heat generated by the fuel cell to an application external to the fuel cell system.

12. The fuel cell system of claim 1 further comprising a mixing chamber in fluid communication with the anode passage outlets and the cathode passage inlets upstream of the combustion chamber, and further comprising a quenching zone downstream from the combustion chamber.

13. A fuel cell system comprising, in combination:
a fuel cell stack contained within a containment vessel, the fuel cell stack comprising:
a plurality of fuel cells, each fuel cell comprising
a top plate;
a bottom plate;
an anode passage positioned between the top and bottom plates for channeling fuel gas therethrough, the anode passage comprising an anode, an anode passage inlet and an anode passage outlet;
a cathode passage positioned between the top and bottom plates adjacent and parallel to the anode passage for channeling oxidant gas therethrough, the cathode passage comprising a cathode, a cathode passage inlet and a cathode passage outlet;
a combustion chamber positioned between the top and bottom plates and in direct fluid communication with the anode passage outlet and the cathode passage inlet, the combustion chamber comprising a circular opening in the top plate and the bottom plate;
a fuel delivery manifold in fluid communication with a fuel gas source and the anode passage inlet;
a first oxidant source in fluid communication with the combustion chamber;
a carrier gas source in fluid communication with the cathode passage; and
an electrolyte operatively coupled to the anode and the cathode; and
electrical contacts operatively connected to the fuel cell stack.

14. The fuel cell system according to claim 13, further comprising a plurality of additional anode passages, cathode passages, corresponding combustion chambers, and corresponding electrolytes in each fuel cell.

15. The fuel cell system according to claim 13, wherein the combustion chambers in each fuel cell align with a combustion chamber in each of the other fuel cells.

16. The fuel cell system according to claim 15, further comprising a diffusion tube in fluid communication with the first oxidant source and extending through each of the combustion chambers in the fuel cells.

17. The fuel cell system according to claim 16, further comprising an ignition chamber and a secondary fuel source, the ignition chamber in fluid communication with each of the first oxidant source, the secondary fuel source, and the diffusion tube, wherein the oxidant source and the secondary fuel source are combusted in the ignition chamber.

18. The fuel cell system according to claim 17, further comprising a cathode gas intake manifold external to the fuel cells and in fluid communication with the cathode passage inlets, and a recirculation passage interconnecting the cathode passage outlets and the cathode gas intake manifold.

19. A fuel cell system comprising, in combination:
a fuel cell stack contained within a containment vessel, the fuel cell stack comprising:
a plurality of fuel cells, each fuel cell comprising
a top plate;
a bottom plate;
a plurality of anode passages positioned between the top and bottom plates for channeling fuel gas therethrough, each anode passage comprising an anode, an anode passage inlet and an anode passage outlet;
a plurality of cathode passages positioned between the top and bottom plates adjacent and parallel to the anode passage for channeling oxidant gas therethrough, each cathode passage comprising a cathode, a cathode passage inlet and a cathode passage outlet;
a plurality of combustion chambers positioned between the top and bottom plates, each combustion chamber in direct fluid communication with a corresponding anode passage outlet and a corresponding cathode passage inlet, and comprising a circular opening in the top plate and the bottom plate;
a fuel delivery manifold in fluid communication with a fuel gas source and each anode passage inlet;
a first oxidant source in fluid communication with each combustion chamber;
a carrier gas source in fluid communication with each cathode passage inlet; and
a plurality of electrolytes, each electrolyte operatively coupled to a
corresponding anode and corresponding cathode;
a cathode gas intake manifold external to the fuel cells and in communication with each cathode passage inlet;
a recirculation passage interconnecting the cathode passage outlets and the cathode gas intake manifold; and
electrical contacts operatively connected to the fuel cell stack.

* * * * *